United States Patent
Palmeto et al.

(10) Patent No.: US 10,548,433 B2
(45) Date of Patent: Feb. 4, 2020

(54) TOASTER AND METHOD FOR CONTROLLING SAID TOASTER

(71) Applicant: Whirlpool EMEA S.p.A., Pero (MI) (IT)

(72) Inventors: Stefano Palmeto, Fabriano (IT); Marcello Riderelli Belli, Osimo (IT); Francesco Giardini, Fabriano (IT)

(73) Assignee: Whirlpool EMEA S.P.A., Pero (MI) (IT)

( * ) Notice: Subject to any disclaimer, the term of this patent is extended or adjusted under 35 U.S.C. 154(b) by 281 days.

(21) Appl. No.: 15/102,354

(22) PCT Filed: Dec. 1, 2014

(86) PCT No.: PCT/IB2014/066474
§ 371 (c)(1),
(2) Date: Jun. 7, 2016

(87) PCT Pub. No.: WO2015/087196
PCT Pub. Date: Jun. 18, 2015

(65) Prior Publication Data
US 2016/0353930 A1    Dec. 8, 2016

(30) Foreign Application Priority Data

Dec. 11, 2013    (IT) .............................. TO2013A1012

(51) Int. Cl.
*A47J 37/08* (2006.01)
*A23L 5/10* (2016.01)

(52) U.S. Cl.
CPC .............. *A47J 37/0835* (2013.01); *A23L 5/15* (2016.08); *A23V 2002/00* (2013.01)

(58) Field of Classification Search
CPC .... A47J 37/08; A47J 37/0857; A47J 37/0835; A23L 5/15
USPC ......... 99/332, 373, 389, 391, 393, 348, 339, 99/340, 325, 326, 327, 328, 331, 333, 99/334, 335, 467, 468, 476, 483, 484, 99/486; 426/466, 496, 520; 219/492, 219/413, 408
See application file for complete search history.

(56) References Cited

U.S. PATENT DOCUMENTS

| 3,558,855 A * | 1/1971 | Stanek | A47J 37/0814 219/385 |
| 5,385,082 A * | 1/1995 | Huggler | A47J 37/0821 219/489 |
| 5,708,255 A * | 1/1998 | Lamanna | A47J 37/0635 219/385 |

(Continued)

FOREIGN PATENT DOCUMENTS

| EP | 2017536 A1 * | 1/2009 | ............... F24C 7/06 |
| WO | 2013155574 A1 | 10/2013 | |

*Primary Examiner* — Jimmy Chou
(74) *Attorney, Agent, or Firm* — Price Heneveld LLP

(57) ABSTRACT

A toaster includes a first heating compartment, a first heating element associated with the first heating compartment, and a control unit in communication with the first heating element for executing an activation of the heating element by providing a current thereto and a deactivation of the heating element by disconnecting the current therefrom, the control unit further executing a main heating program comprising a succession of activations, separated by respective deactivations.

11 Claims, 1 Drawing Sheet

(56) References Cited

U.S. PATENT DOCUMENTS

| | | | |
|---|---|---|---|
| 6,549,818 B1* | 4/2003 | Ali | G06Q 30/02 700/90 |
| 6,571,687 B1* | 6/2003 | Wu | A47J 37/0842 219/413 |
| 6,595,111 B1* | 7/2003 | Chiu | A47J 37/0842 219/386 |
| 7,126,088 B2* | 10/2006 | Horton | F24C 7/082 219/412 |
| 7,238,921 B2* | 7/2007 | Beesley | A47J 27/04 219/386 |
| 7,297,903 B1* | 11/2007 | March | A47J 37/0857 219/388 |
| 7,351,939 B2* | 4/2008 | Boyle | A47J 37/0857 219/386 |
| 7,921,767 B2* | 4/2011 | Cook | A47J 37/045 219/398 |
| 8,049,142 B2* | 11/2011 | Blackson | F24C 7/087 219/398 |
| 2002/0069764 A1* | 6/2002 | Cohen | A47J 37/0611 99/331 |
| 2002/0113054 A1* | 8/2002 | Arel | A47J 37/0857 219/388 |
| 2005/0204927 A1* | 9/2005 | Boyle | A47J 37/0857 99/389 |
| 2006/0065129 A1* | 3/2006 | Yu | A47J 37/085 99/385 |
| 2006/0185527 A1* | 8/2006 | Shei | A47J 39/006 99/467 |
| 2006/0201333 A1 | 9/2006 | Friel, Sr. et al. | |
| 2009/0272279 A1* | 11/2009 | Kieck | A47J 47/10 99/468 |
| 2010/0154653 A1* | 6/2010 | Douglas | A47J 37/085 99/385 |
| 2010/0175562 A1* | 7/2010 | Brady | A47J 37/0814 99/332 |
| 2011/0067578 A1* | 3/2011 | Volatier | A47J 37/0814 99/385 |
| 2011/0132895 A1 | 6/2011 | Tassan-Mangina et al. | |
| 2011/0185918 A1* | 8/2011 | Zhang | A47J 36/06 99/391 |
| 2012/0167777 A1* | 7/2012 | Brady | A47J 37/0842 99/332 |
| 2013/0236614 A1* | 9/2013 | Schandel | A47J 27/00 426/231 |
| 2014/0157996 A1* | 6/2014 | Korbin | A47J 37/0807 99/342 |
| 2014/0199446 A1* | 7/2014 | Huegerich | A47J 37/0857 426/233 |
| 2014/0318382 A1* | 10/2014 | Hornbeck | A47J 37/0857 99/332 |
| 2014/0352549 A1* | 12/2014 | Upston | A47J 37/0857 99/334 |
| 2016/0097542 A1* | 4/2016 | Armstrong | F24C 7/087 99/337 |

* cited by examiner

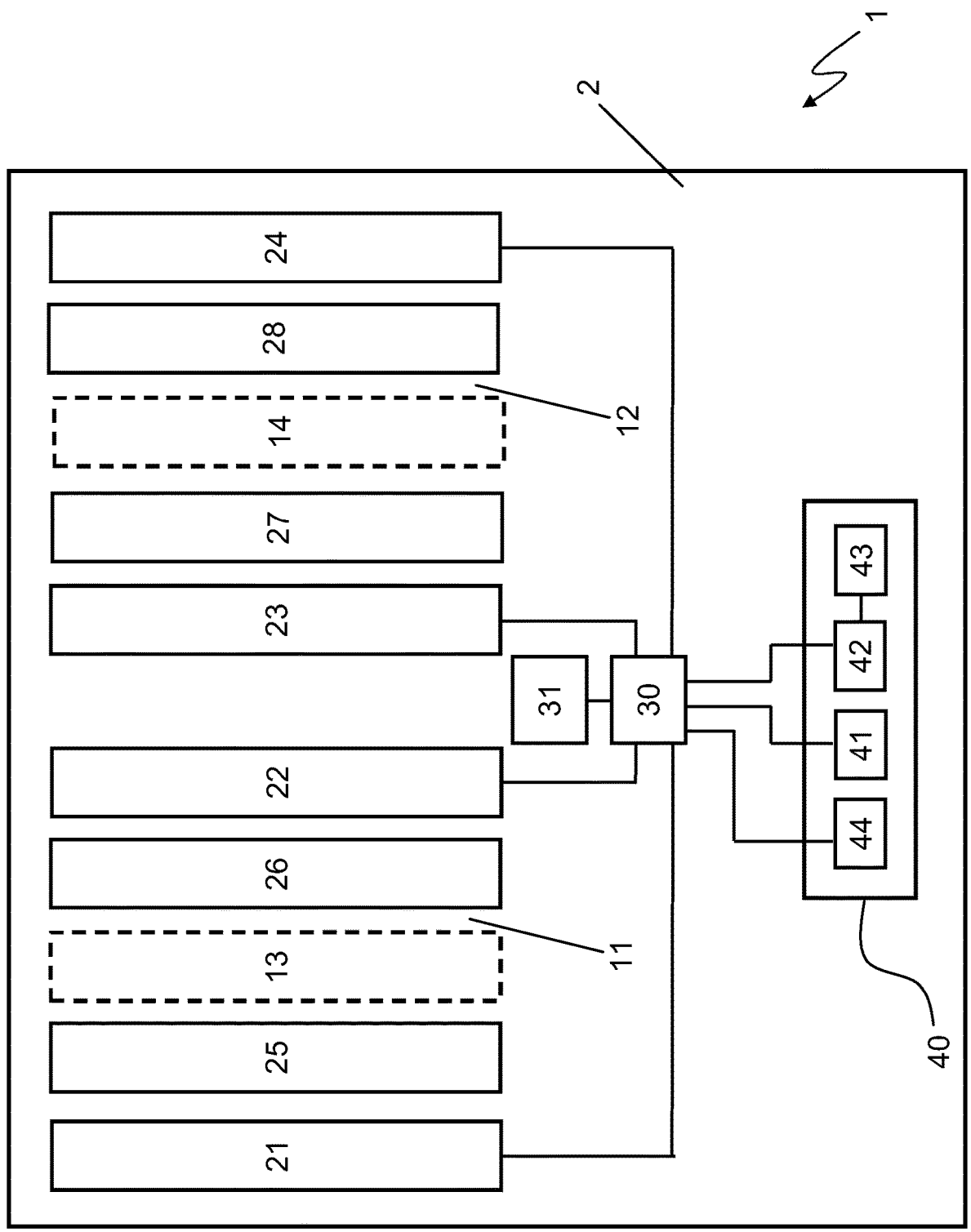

TOASTER AND METHOD FOR CONTROLLING SAID TOASTER

BACKGROUND

The present invention relates to a toaster and to a method for controlling said toaster.

As is known, a toaster includes one or more heating compartments, into which foods to be heated are inserted. Said foods may comprise, for example, one or more slices of bread; in case of two slices of bread, other foods can be placed in between, such as, for example, sliced salami and ham, cheese, vegetables, etc.

A toaster is also known which additionally comprises one or more grids for centering the food within said heating compartments. Heating elements are also associated with the heating compartments, typically consisting of electric resistors that, when run by electric current, transfer heat to the foods inserted in the heating compartments.

In some cases accessory pliers can be used, which facilitate the insertion and extraction of the foods from the heating compartments.

Known toasters make available to the user one or more heating programs, each one characterized by a respective time duration. By means of a suitable selector, the user can choose the preferred program as a function of the type of food to be heated.

Known toasters, however, may not be able to ensure optimal results for some food categories, such as, for example, toasts. For example, by selecting short programs one can obtain a satisfactory browning of the outer surface of the toast, but the inside will not be heated appropriately. Conversely, by selecting longer programs, the inside of the toast will be heated appropriately, but the outer surfaces will get too hot or may even burn.

SUMMARY

The Applicant has found that the above-described problems with existing toasters is at least partially due to the fact that, in short programs, the heat is not allowed sufficient time to penetrate the innermost layers of the toast, which will not get sufficiently hot.

Accordingly, by setting a heating program including a suitable series of activations/deactivations of the heating means, the heat can be allowed to reach also the innermost layers of the food so as to reduce the above-described undesired effects, such as burning, on the outermost surfaces.

Accordingly, an aspect of the disclosure provides a toaster, equipped with at least one heating compartment and at least one heating element associated with said heating compartment, with a control unit. The control unit is configured for executing a main heating program comprising a succession of activations, separated by respective deactivations, of said at least one heating element.

According to an aspect of the disclosure, a toaster includes a heating compartment, a first heating element associated with the heating compartment and adapted to provide heat to the heating compartment, and a control unit in communication with the first heating element for executing an activation of the heating element by providing a current thereto and a deactivation of the heating element by disconnecting the current therefrom. The control unit further executes a main heating program comprising a succession of activations separated by respective deactivations.

According to another aspect, a method for controlling a toaster having a first heating element adapted to heat food arranged in a first heating compartment includes executing a plurality of activation of the heating element by providing power thereto and a deactivation of the heating element by disconnecting power therefrom according to a main heating program comprising a succession of activations separated by respective deactivations of the first heating element.

According to another aspect, a toaster includes a heating compartment defining an interior, and a first heating element disposed within the interior of the heating compartment. A control unit is in communication with the first heating element for executing an activation of the heating element by providing a current thereto and a deactivation of the heating element by disconnecting the current therefrom. The control unit further executes one of a first program type, including an activation of the heating element followed by a deactivation of the heating element after a first program duration, and a second program type, including alternating activations and deactivations of the heating element for respective intermediate activation and deactivation durations covering a total second program duration.

According to another aspect, the disclosure relates to a method for controlling a toaster, said toaster comprising at least one heating element adapted to heat food arranged in a heating compartment, said method comprising the execution of a main heating program comprising a plurality of activations and deactivations of said at least one heating element.

In this manner, the heat received by the food during the activation phases of the heating element can propagate and penetrate into even the innermost layers of the food itself, in particular by exploiting the deactivation phases, without the outer surfaces getting excessively dry or burned.

In an example, said control unit is configured for executing a plurality of heating programs, said plurality of heating programs comprising said main heating program.

Said plurality of heating programs may comprise:
a first group of heating programs, in each one of which said at least one heating element is activated with substantial continuity for the whole duration of the program;
a second group of heating programs, in each one of which said at least one heating element is activated/deactivated for a plurality of times during the execution of the program, said main heating program being comprised in said second group.

Preferably, said toaster further comprises a user interface allowing a user to select one heating program among said plurality of heating programs.

Said user interface may comprise a switching module configured for switching said toaster between a first operating condition, wherein it executes programs of said first group, and a second operating condition, wherein it executes programs of said second group.

Further, said user interface may also comprise a selection module configured for allowing a selection among the programs of the first group when said toaster is in the first operating condition, and for allowing a selection among the programs of the second group when said toaster is in the second operating condition.

Every time it is turned on, said toaster preferably set itself into the first operating condition.

Said selection module may have a plurality of options for the selection of said heating programs.

At least one of said options may correspond to a program of the first group when said toaster is in the first operating condition and to a program of the second group when said toaster is in the second operating condition.

Said main heating program may comprise a plurality of activations of said at least one heating element, each one having a duration of 40 seconds to 50 seconds, each pair of consecutive activations being separated by one deactivation having a duration of 10 seconds to 20 seconds.

Further features and advantages will become more apparent from the following description of a preferred and non-limiting embodiment of the invention.

BRIEF DESCRIPTION OF THE DRAWING

Said description refers to the annexed FIG. 1, which shows a representative block diagram of a toaster in accordance with the present disclosure.

DETAILED DESCRIPTION OF THE EMBODIMENTS

With reference to the annexed drawings, reference numeral 1 designates, as a whole, a toaster in accordance with the present disclosure.

The toaster 1 comprises, first of all, a heating compartment 11, 12, into which the food articles 13, 14 to be heated are positioned.

In the illustrated embodiment, the toaster 1 comprises two heating compartments 11, 12, each one adapted to receive a respective food article 13, 14.

The food articles 13, 14 may comprise, by way of example, slices of bread, toasts, sandwiches, or the like.

Each one of the compartments 11, 12 may have a substantially parallelepiped shape, i.e. a shape suitable for housing a slice of bread (to be toasted) or multiple slices of bread between which at least one other food is interposed (i.e. a sandwich), with some clearance allowing comfortable insertion and extraction.

The toaster 1 further comprises at least one heating element 21, 22, 23, 24, associated with the at least one heating compartment 11, 12 and adapted to heat the food articles 13, 14 contained in said at least one compartment.

For the purpose of positioning the food articles 13, 14 correctly, each heating compartment 11, 12 can be associated with a respective positioning structure. Each positioning structure may comprise a pair of centering grids 25, 26; 27, 28. Said grids may be movable to allow the food 13, 14 to be centered properly.

In the illustrated embodiment, each heating compartment 11, 12 is associated with a respective pair of heating elements 21, 22; 23, 24.

Each heating element 21-24 may be integral with the frame 2 of the toaster 1.

Each heating element 21-24 can advantageously be implemented as an electric resistor, e.g. a coil-shaped electric resistor element, and positioned on one side of the heating compartment 11, 12. The heating elements 21, 22; 23, 24 of each pair may be located on opposite sides of the respective heating compartment 11, 12, in order to heat both surfaces of the food articles 13, 14.

When food is to be heated, the at least one heating element 21-24 is preferably electrically connected with a predetermined current, so as to generate the necessary heat and transfer it to the food positioned in the respective heating compartment 11, 12.

In accordance with the disclosure, the toaster 1 further includes a control unit 30 associated with the at least one heating element 21, 22, 23, 24.

The control unit 30 acts upon said at least one heating element 21-24, such as by respectively closing and opening the above-mentioned electrical current therewith, in order to execute at a main heating program that includes a succession of activations and deactivations of the at least one heating element 21-24.

In other words, executing the main heating program will cause control unit 30 to activate and deactivate the at least one heating element 21-24 multiple times, so that, given a certain total duration of the main heating program, the total on time of the at least one heating element 21, 22, 23, 24 will be shorter than the overall duration and will be distributed in a predetermined manner over the overall duration of the program.

By way of example only, the main heating program may comprise a plurality of activations of the at least one heating element 21, 22, 23, 24, each one having a duration of 40 seconds to 50 seconds, each pair of consecutive activations being separated by one deactivation having a duration of 10 seconds to 20 seconds. The total duration of the program may be, for example, between 190 seconds and 260 seconds, during which the at least one heating element 21-24 is activated 4 times such that it is activated for a total time between 160 seconds and 200 seconds.

In a further example, when the heating compartment 11, 12 is associated with a pair of heating elements 21, 22; 23, 24, the succession of activations/deactivations in the main heating program is imposed on both of such heating elements.

The control unit 30 may be further generally configured for executing, in addition to the main heating program, a plurality of heating programs.

By way of example, said plurality of heating programs can be divided into two groups.

The heating programs of a first one of the two groups provides for activating the at least one heating element 21, 22, 23, 24 with substantial continuity, i.e. with no interruptions, for the whole duration of each program.

The programs of a second one of the two groups, by contrast, provides for alternately and successively activating and deactivating the at least one heating element 21, 22, 23, 24 over a plurality of cycles during the execution of each program.

The above-mentioned main heating program is one of the second group of programs.

The below table shows some examples of programs belonging to the second group. The first and third columns show some exemplary durations of periods of activation of the at least one heating element 21, 22, 23, 24. The second and fourth columns show some exemplary durations of the respective periods of deactivation of the at least one heating element 21, 22, 23, 24, and the fifth column shows the total duration of each program.

| ON | OFF | ON | OFF | Total |
|---|---|---|---|---|
| 55" | 30" | 55" | 30" | 2' 50" |
| 1' | 30" | 1' | 30" | 3' |
| 1' 10" | 30" | 1' 10" | 30" | 3' 20" |
| 1' 15" | 30" | 1' 15" | 30" | 3' 30" |
| 1' 20" | 32" | 1' 20" | 32" | 3' 44" |
| 1' 25" | 30" | 1' 25" | 30" | 3' 50" |

The toaster 1 may further comprise a user interface 40 allowing a user to select one heating program among said plurality of heating programs.

In an embodiment, the user interface 40 may comprise a switching module 41.

The switching module 41 may be configured for switching the toaster 1 between a first operating condition and a second operating condition.

In the first operating condition, the toaster 1 executes the programs of the first group, as described above.

In the second operating condition, the toaster 1 executes the programs of the second group, as also described above.

In one embodiment, the switching module 41 may be implemented as a push-button.

The user interface 40 can further comprise a selection module 42, through which the user can select the specific program to be executed.

In an example, when the toaster 1 is in the first operating condition, the selection module 42 allows the selection of programs within the first group.

Further, when the toaster 1 is in the second operating condition, the selection module 42 allows the selection of programs within the second group.

In another example, the selection module 42 may be implemented as an electromechanical selector, or as one or more push-buttons, possibly associated with a display.

When the toaster 1 is in the first operating condition, the selection module 42 may be configured to not allow the selection of programs of the second group.

Further, when the toaster 1 is in the second operating condition, the selection module 42 may be configured to not allow the selection of programs of the first group.

In an embodiment, the selection module may offer the user a limited number of options with respect to ones of the various selectable programs that are selectable at any given instance. In one aspect, such a limited number of selectable programs can be smaller than the sum of the total programs of the first group and the total programs of the second group.

In an embodiment, the number of options made available by the selection module 42 can be equal to the number of programs of the first group or the number of programs of the second group, whichever is greater.

For example, at least one option (e.g. a certain position of a selector) offered by the selection module 42 can have two effects: 1) if the toaster 1 is in the first operating condition, said option offered by the selection module 42 can correspond to a respective program of the first group; and, 2) if the toaster 1 is in the second operating condition, the same option offered by the selection module 42 (e.g. the same position of the selector) can correspond to a respective program of the second group.

In one aspect, a plurality of options offered by the selection module 42 can each be associated with two different effects, as described above, depending on the selected operating condition of the toaster 1.

Following a user input by manipulation of the switching module 41, the switching module 41 can generate a corresponding signal for the control unit 30. In this manner, the switching module 41 can "interpret" the selection commands coming from the selection module 42.

In a further embodiment, the control unit 30 is associated with associated memory 31, which is logically and/or physically divided into two portions. The first portion stores the characteristic parameters of the programs of the first group (typically the time duration thereof), whereas the second portion stores the characteristic parameters of the programs of the second group (e.g., heating element on/off times, number of activations/deactivations, etc.).

As a function of the signal received from the switching module 41, the control unit 30 can select either the first or the second portion of the memory 31 in order to make the selection according to what has been entered through the selection module 42.

Merely by way of example, the memory 31 may contain three programs in the first portion (first group of heating programs) and three programs in the second portion (second group of heating programs).

In such an example, the selection module 42 will give the user the possibility of choosing from three programs; whether these will be the programs of the first group or the programs of the second group will be determined by the switching module 41, in particular, by the signal that the latter will send to the control unit 30 for selecting either the first portion or the second portion of the memory 31.

When a user wants to select a certain program, e.g. of the second group, he/she can first check whether the toaster 1 is in the first or in the second operating condition.

If the toaster 1 is in the first operating condition, the user can, through the switching module 41, switch the toaster 1 into the second operating condition.

If the toaster 1 is in the second operating condition (possibly after the user's intervention through the switching module 41, as described above), the user will be allowed to select the main heating program among the various programs included in the second group.

Note that, in general, the number of programs in the first group may be different from the number of programs in the second group.

In a particular embodiment, every time the toaster 1 is turned on, it will normally set itself into the first operating condition.

In other words, the toaster 1 is so configured as to execute, by default, the heating programs of the first group, irrespective of the operating condition the toaster was in when it was last turned off.

The user interface 40 may further comprise an indicator or signaling device 43 configured for informing the user about the operating condition that the toaster 1 is in.

In one embodiment, the switching module 41 comprises a key or a selector; the signaling device 43 may comprise a mechanical structure holding said key or selector in different positions depending on whether the toaster 1 is in the first or in the second operating condition.

In a different embodiment, the signaling device 43 may be a luminous one (e.g. comprising one or more signaling LEDs) and/or may comprise or use a display (not shown), whereon indications can be shown about the operating condition of the toaster 1. In this embodiment, the signaling device 43 may be directly activated by the switching module 41, or it may be connected to the control unit 30, from which it will receive the information to be presented to the user.

In one embodiment, the user interface 40 further comprises an auxiliary selection device 44 that allows the user to cause the selected operating mode and program to be executed with respect to only one of the two heating compartments 11, 12, or both.

The heating program selected through the selection module 41 can be executed by the heating elements 21-24 associated with the selected compartment(s) via the auxiliary selection device 44.

By executing programs such as, for example, the above-mentioned main heating program, it is possible to optimally heat both the outer surfaces and the innermost layers of the food inserted in the heating compartment.

This may improve the quality of the food provided to the user.

Furthermore, the toaster according to the disclosure has a simple structure that may facilitate easy and/or economic manufacturing.

In particular, it should be noted that, in one of the various embodiments described herein, the selection from the programs proposed herein (i.e. programs comprising a plurality of activations/deactivations of the heating elements within the same program) can be made by using the same selection module used for selecting programs of the type known in the art, i.e. the programs of the above-mentioned first group.

The invention claimed is:

1. A toaster comprising:
a heating compartment;
a first heating element associated with the heating compartment and adapted to provide heat to the heating compartment;
a control unit having memory associated therewith and being in communication with the first heating element for executing an activation of the heating element by providing a current thereto and a deactivation of the heating element by disconnecting the current therefrom, the control unit further executing a main heating program stored in the memory and comprising a predetermined succession of activations separated by respective deactivations, wherein:
said control unit selectively executes a plurality of heating programs, said plurality of heating programs comprising said main heating program; and
said plurality of heating programs comprise:
a first group of heating programs, in each one of which said first heating element is stored in the memory and activated with substantial continuity for an entire duration of the respective one of the first group of heating programs; and
a second group of heating programs, each one of which is stored in the memory and includes performing a plurality of activations, separated by respective deactivations, of the first heating element during the execution of the one of the second group of programs, said main heating program being one of the second group of heating programs; and
a user interface for selection of one heating program among said plurality of heating programs, wherein said user interface comprises:
a button configured for switching said toaster from a first operating condition to a second operating condition, wherein the control unit executes programs of said first group, and a second operating condition, wherein the control unit executes programs of said second group; and
an electromechanical selector configured for facilitating a selection among the programs of the first group when said toaster is in the first operating condition, and for allowing a selection among the programs of the second group when said toaster is in said second operating condition.

2. The toaster of claim 1, wherein said electromechanical selector offers a plurality of options for the selection of said heating programs, wherein at least one of said options corresponds to a program of the first group when said toaster is in the first operating condition, or to a program of the second group when said toaster is in the second operating condition.

3. The toaster of claim 1, wherein the first operating condition is a default condition.

4. The toaster of claim 1, wherein said user interface comprises a plurality of indicating lights configured for indicating a selected one of the first and second operating conditions.

5. The toaster of claim 1, wherein said main heating program comprises a plurality of activations of the first heating element, each one of the plurality of activations having a duration of 40 seconds to 50 seconds, each pair of consecutive activations being separated by one of the deactivations, the one of the deactivations having a duration of 10 seconds to 20 seconds.

6. The toaster of claim 1, further comprising a pair of centering grids on opposing sides of the heating compartment.

7. A toaster, comprising:
a heating compartment defining an interior;
a first heating element disposed within the interior of the heating compartment;
a control unit having memory associated therewith and being in communication with the first heating element for executing an activation of the heating element by providing a current thereto and a deactivation of the heating element by disconnecting the current therefrom, the control unit further executing one of:
a first program type stored in the memory and including an activation of the heating element followed by a deactivation of the heating element after a first program duration; and
a second program type stored in the memory and including alternating activations and deactivations of the heating element for respective intermediate activation and deactivation durations covering a total second program duration; and
a user interface for selection of one heating program among said plurality of heating programs, wherein said user interface comprises:
a button configured for switching said toaster from a first operating condition to a second operating condition, wherein the control unit executes programs of said first type, and a second operating condition, wherein the control unit executes programs of said second type; and
a selection device receiving a selection of one of the first program type and the second program type and a corresponding one of a first program duration and a second program duration, wherein when the selection is of the second program type, the intermediate activation and deactivation durations are selected from predetermined values corresponding with the selected second program duration.

8. A toaster comprising:
a heating compartment;
a first heating element associated with the heating compartment and adapted to provide heat to the heating compartment;
a control unit having memory associated therewith and being in communication with the first heating element for executing an activation of the heating element by providing a current thereto and a deactivation of the heating element by disconnecting the current therefrom, the control unit further selectively executing a plurality of heating programs stored in the memory and including a first group of heating programs and a second group of heating programs comprising a succession of activations separated by respective deactivations; and a user interface for selection of one heating program among said plurality of heating programs, the user interface including:
    a button configured for switching said toaster from a first operating condition, wherein the control unit executes programs of said first group, to a second operating condition, wherein the control unit executes programs of said second group; and
    an electromechanical selector configured for facilitating a selection among the programs of the first group when said toaster is in the first operating condition, and for allowing a selection among the programs of the second group when said toaster is in said second operating condition.

9. The toaster of claim 8, wherein said electromechanical selector offers a plurality of options for the selection of said heating programs, wherein at least one of said options corresponds to a program of the first group when said toaster is in the first operating condition, or to a program of the second group when said toaster is in the second operating condition.

10. The toaster of claim 8, wherein the first operating condition is a default condition.

11. The toaster of claim 8, wherein said user interface comprises a plurality of indicating lights configured for indicating a selected one of the first and second operating conditions.

* * * * *